(12) United States Patent
Farrell et al.

(10) Patent No.: US 11,852,279 B2
(45) Date of Patent: Dec. 26, 2023

(54) DISPLAY MOUNTING SYSTEMS AND METHODS

(71) Applicant: Peloton Interactive, Inc., New York, NY (US)

(72) Inventors: Heidi Serene Farrell, Brooklyn, NY (US); Nigel Alcorn, Brooklyn, NY (US); Benjamin G. Schultz, Brooklyn, NY (US); Jason Poure, Croton-on-Hudson, NY (US); Lee Hendrickson, Zurich (CH)

(73) Assignee: Peloton Interactive, Inc, New York, NY (US)

( * ) Notice: Subject to any disclaimer, the term of this patent is extended or adjusted under 35 U.S.C. 154(b) by 239 days.

(21) Appl. No.: 17/011,751

(22) Filed: Sep. 3, 2020

(65) Prior Publication Data

US 2022/0062736 A1    Mar. 3, 2022

(51) Int. Cl.
| | | |
|---|---|---|
| *F16M 11/10* | (2006.01) | |
| *A63B 22/06* | (2006.01) | |
| *A63B 71/06* | (2006.01) | |
| *F16M 13/02* | (2006.01) | |
| *F16M 11/20* | (2006.01) | |

(52) U.S. Cl.
CPC ......... *F16M 11/10* (2013.01); *A63B 22/0605* (2013.01); *A63B 71/0619* (2013.01); *F16M 13/02* (2013.01); *A63B 2071/0658* (2013.01); *A63B 2225/09* (2013.01); *F16M 11/2014* (2013.01); *F16M 2200/022* (2013.01); *F16M 2200/041* (2013.01)

(58) Field of Classification Search
CPC ............. F16M 11/10; F16M 2200/022; F16M 2200/041; F16M 11/2014; F16M 13/02; A63B 71/0619; A63B 22/0605; A63B 2071/0658; A63B 2225/09
See application file for complete search history.

(56) References Cited

U.S. PATENT DOCUMENTS

| | | | |
|---|---|---|---|
| 6,570,627 B1 * | 5/2003 | Chang | F16M 11/10 |
| | | | 348/836 |
| 6,698,063 B2 * | 3/2004 | Kim | F16M 11/10 |
| | | | 16/337 |
| 6,899,311 B1 | 5/2005 | Ternus | |

(Continued)

FOREIGN PATENT DOCUMENTS

| | | |
|---|---|---|
| CN | 105276342 A | 1/2016 |
| GB | 2357888 A | 7/2001 |

*Primary Examiner* — Eret C McNichols
(74) *Attorney, Agent, or Firm* — Haynes and Boone, LLP

(57) ABSTRACT

Display mounting systems and methods are described herein. A mounting system may include a barrel and a tongue extending from the barrel. The barrel may be securable to a device and configured to rotate the device relative to a mount. The barrel may define a hinge axis for the device. The tongue may be configured to extend from the device for connection to the mount. The mounting system may include a friction or locking hinge releasably holding the barrel in position. The mounting system may be associated with a display of an exercise device. The exercise device may include the mount. The display may include a housing and the mounting system. The barrel may be secured within the housing to define the hinge axis internal to the housing. The tongue may extend through an aperture disposed in the housing.

19 Claims, 14 Drawing Sheets

(56) References Cited

U.S. PATENT DOCUMENTS

| | | | |
|---|---|---|---|
| 7,338,019 B2* | 3/2008 | Liu | F16M 11/24 |
| | | | 248/921 |
| 7,984,881 B2* | 7/2011 | Liu | F16M 11/16 |
| | | | 361/679.01 |
| 8,047,488 B2* | 11/2011 | Wang | F16M 11/10 |
| | | | 248/176.1 |
| 9,687,076 B2* | 6/2017 | Su | G06F 1/1626 |
| 10,344,911 B2* | 7/2019 | Mills | F16M 11/2014 |
| 11,067,215 B2* | 7/2021 | Lee | F16M 11/105 |
| 11,285,064 B2* | 3/2022 | Fouts | A61G 13/101 |
| 11,333,295 B2* | 5/2022 | Huang | F16M 11/16 |
| 11,359,760 B2* | 6/2022 | Huang | F16F 1/26 |
| 11,507,134 B2* | 11/2022 | Yamamoto | G06F 1/16 |
| 2007/0119025 A1* | 5/2007 | Hu | F16M 11/10 |
| | | | 16/340 |
| 2008/0093517 A1 | 4/2008 | Chen | |
| 2014/0038781 A1 | 2/2014 | Foley et al. | |
| 2018/0200566 A1 | 7/2018 | Weston et al. | |
| 2022/0252208 A1* | 8/2022 | Huang | F16M 11/04 |

* cited by examiner

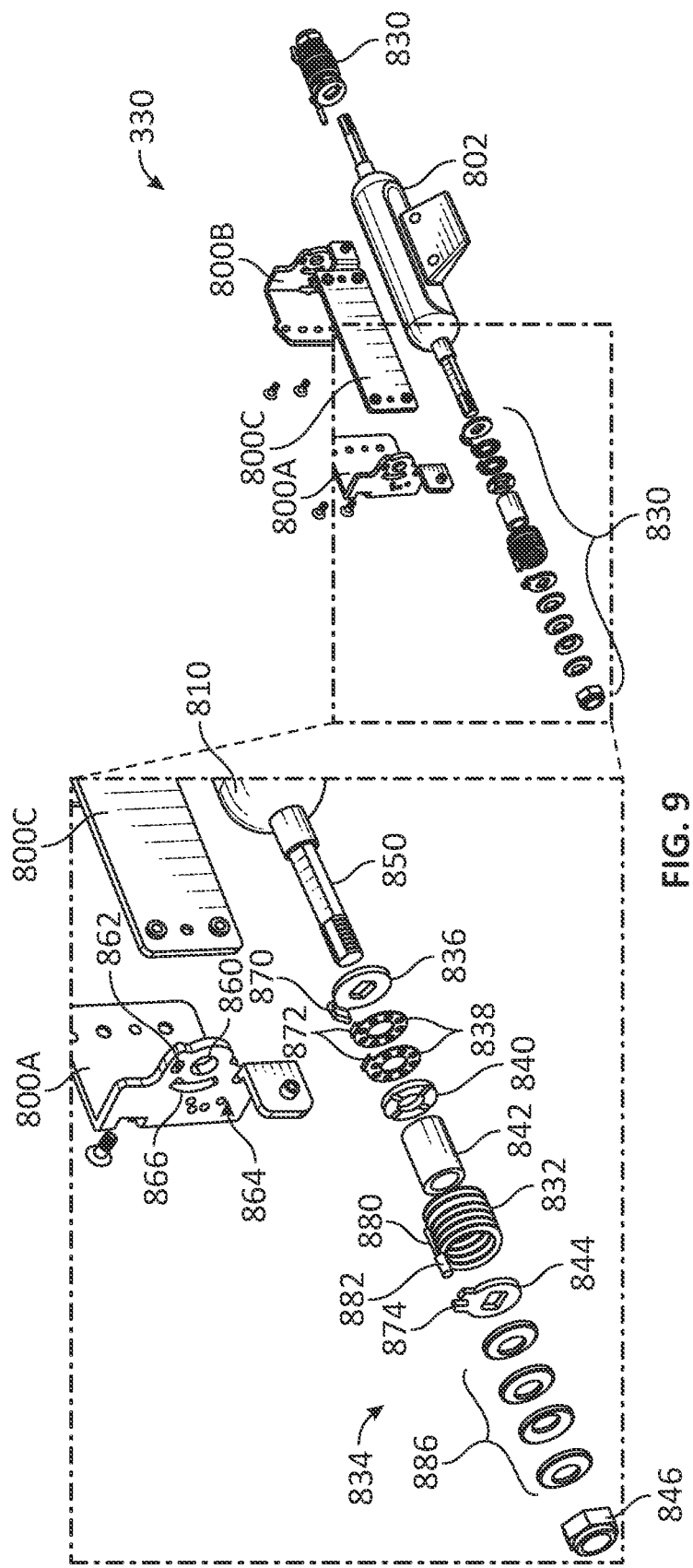

DISPLAY MOUNTING SYSTEMS AND METHODS

TECHNICAL FIELD

One or more embodiments relate generally to displays for exercise equipment and, more particularly, to systems and methods for mounting a display to an exercise device.

BACKGROUND

Exercise devices, such as exercise bikes, treadmills, ellipticals, rowers, and the like, often include a display configured to render information to a user during exercise. For example, the display may render workout information, video streams, on-demand workouts, performance metrics, etc. The display may tilt to orient the display as desired by a user. Some tilt mechanisms make it difficult to reposition the display and/or are prone to easily move out of position during exercise. Therefore, there is a need in the art for systems and methods that address the deficiencies noted above, other deficiencies known in the industry, or at least offers an alternative to current techniques.

SUMMARY

Systems and methods are provided for a display mounting system. According to one or more embodiments of the present disclosure, a mounting system is provided. The mounting system may include a barrel securable to a device and configured to rotate the device relative to a mount. The barrel may define a hinge axis for the device. The mounting system may include a tongue extending from the barrel and configured to extend from the device for connection to the mount. The barrel may define the hinge axis internal to the device. The tongue may pass through a portion of the device, such as through an aperture disposed in a housing of the device, for connection to the mount.

According to one or more embodiments of the present disclosure, an exercise device is provided. The exercise device may include a mount and a display connected to the mount. The display may include a housing and a mounting system. The housing may have an aperture disposed therein. The mounting system may include a barrel, a tongue, and a friction or locking hinge. The barrel may be secured within the housing and define a hinge axis internal to the housing, such that rotation of the barrel about the hinge axis rotates the display up and down relative to the mount. The tongue may extend from the barrel through the aperture and connect to the mount. The friction or locking hinge may releasably hold the barrel at a desired position.

According to one or more embodiments of the present disclosure, a method is provided. The method may include positioning a mounting system at least partially within a housing of a display to define a hinge axis internal to the housing. The mounting system may include a barrel, a tongue extending from the barrel, and a friction or locking hinge. The barrel may be securable within the housing and define a hinge axis internal to the housing. The friction or locking hinge may be configured to releasably hold the barrel at a desired position.

Additional features are set forth in part in the description that follows and will become apparent to those skilled in the art upon examination of the specification and drawings or may be learned by the practice of the disclosed subject matter. A further understanding of the nature and advantages of the present disclosure may be realized by reference to the remaining portions of the specification and the drawings, which forms a part of this disclosure.

One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

The description will be more fully understood with reference to the following figures in which components may not be drawn to scale, which are presented as various embodiments of the mounting system for a display described herein and should not be construed as a complete depiction of the scope of the display mounting system.

FIG. 9 illustrates an exploded view of the mounting system in accordance with an embodiment of the disclosure.

Embodiments of the disclosure and their advantages are best understood by referring to the detailed description that follows. It should be appreciated that like reference numerals may be used to identify like elements illustrated in one or more of the figures.

DETAILED DESCRIPTION

Figure 1:
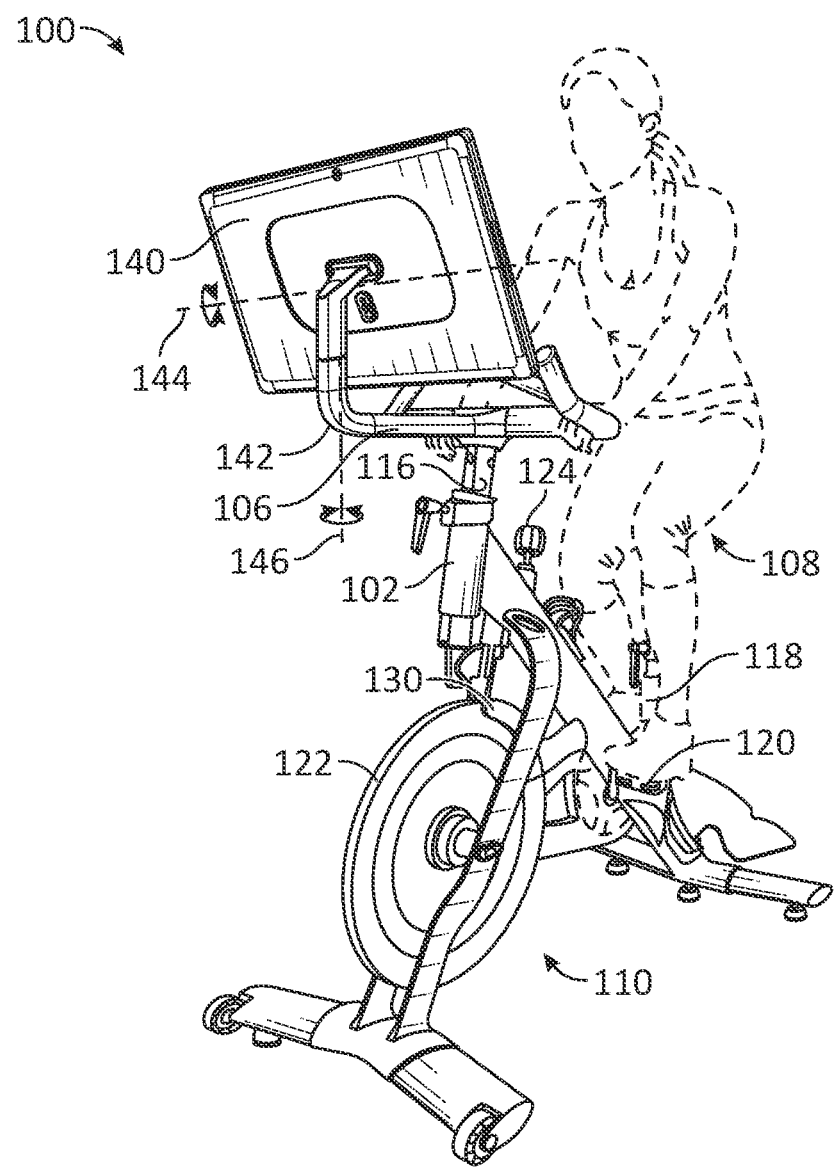
FIG. 1 illustrates a perspective view of an exercise device in accordance with an embodiment of the disclosure.

According to the present disclosure, display mounting systems and methods are provided. A mounting system may include a barrel and a tongue extending from the barrel. The barrel may be securable to a device and configured to rotate the device relative to a mount. The barrel may define a hinge axis for the device, the hinge axis being internal to the device or external to the device depending on the application. The tongue may be configured to extend from the device, such as through a portion of the device, for connection to the mount. The mounting system may include a friction or locking hinge releasably holding the barrel in position. The mounting system may be associated with a display of an exercise device. The exercise device may include a handlebar including the mount. The display may include a housing and the mounting system. The barrel may be secured within the housing to define the hinge axis internal to the housing. The tongue may extend through an aperture disposed in the housing FIG. 1 illustrates a perspective view of an exercise device 100 in accordance with an embodiment of the disclosure. The exercise device 100 may be any type of exercise apparatus designed for cardiovascular and/or strength training of a user, such as an exercise bike, treadmill, elliptical machine, or rowing machine, among others. Referring to FIG. 1, the exercise device 100 is embodied as an exercise bike for illustration only. However, it is contemplated that the concepts described below may be applied to other exercise apparatuses, where suitable, such as a treadmill, a rowing machine, or an elliptical, among others. For example, the concepts described herein may be applied to any device where a user views a display while exercising, as described below.

As shown, the exercise device 100 may include a frame 102 and one or more components connected to the frame 102. For example, the exercise device 100 may include a handlebar 106, a seat 108, and a drive mechanism 110 for operating against a resistance structure, or any combination thereof. The handlebar 106 may be supported by a handlebar post 116, and the seat 108 may be supported by a seat post 118. In some embodiments, the exercise device 100 may include various features that allow adjustment of the position of the seat 108, the position of the handlebar 106, etc. For instance, the height of the handlebar 106 may be adjusted to fit the exercise bike to a user, such as by sliding the handlebar post 116 within the frame 102 towards or away from the frame 102. In like manner, the height of the seat 108 may be adjusted to fit the exercise bike to the user, such as by sliding the seat post 118 within the frame 102 towards and away from the frame 102. In some embodiments, the seat 108 may be adjusted towards or away from the handlebar 106 to further fit the exercise bike to the user.

The drive mechanism 110 may include many configurations. For example, the drive mechanism 110 may include a pair of pedals 120 connected to a crank configured to drive a flywheel 122 through a belt, chain, gearing, or other mechanism. Depending on the application, the flywheel 122 may be a heavy metal disc, an air resistance mechanism, or other suitable device designed for cardiovascular and/or strength training of a user. In some embodiments, the force required to spin the flywheel 122 may be adjusted, such as via a resistance adjustment knob 124 that directly or indirectly increases or decreases a resistance of the flywheel 122 to rotation. For instance, rotation of the resistance adjustment knob 124 in a first direction may cause a resistance structure 130 (e.g., magnets, friction pad, etc.) to move relative to the flywheel 122 in a first manner, increasing the resistance of the flywheel 122 to rotation and increasing the force that the user must apply to the pedals 120 to rotate the flywheel 122. Similarly, rotation of the resistance adjustment knob 124 in a second direction may cause the resistance structure 130 to move relative to the flywheel 122 in a second manner, decreasing the resistance of the flywheel 122 to rotation and decreasing the force that the user must apply to the pedals 120 to rotate the flywheel 122.

In some embodiments, the exercise device 100 may include a display 140 configured to render information (e.g., commands, workout progress, entertainment, etc.) to the user. For example, the display 140 may render one or more video streams, a range of performance metrics, images, or other visual representations. In some embodiments, the display 140 may include or function as a user interface, such as the display 140 including a range of controls. In some embodiments, the display 140 may be used to access membership information, login or logout of an exercise management system, present live and/or archived exercise classes, and other content. In some embodiments, the display 140, or at least the information rendered on the display 140, may be similar to the display or method disclosed in U.S. Patent Application Publication No. 2019/0262665 A1 entitled "EXERCISE SYSTEM AND METHOD," the disclosure of which is hereby incorporated herein by reference in its entirety. The display 140 may be a simple display device (e.g., an LCD screen, an LED screen, etc.), a portion of a computing device (e.g., a tablet, a laptop, etc.), or a portion of a distributed display system, among other examples.

To allow viewing of the display 140 by the user, the display 140 may be mounted in front of the user forward of the handlebar 106 (i.e., such that the handlebar 106 is positioned at least partially between the display 140 and the seat 108). The display 140 may be mounted to the exercise device 100 in many configurations. For instance, the exercise device 100 may include a support arm 142 extending from the handlebar 106. Depending on the application, the support arm 142 may be cantilevered from the handlebar 106, attached to the handlebar 106, or the like. The display 140 may be connected to the support arm 142 to place the display 140 within a viewing area of the user during exercise. The display 140 may be mounted to the support arm 142 via one or more devices or mechanisms configured to adjust the position or orientation of the display 140, as detailed more fully below. For example, the display 140 may be mounted to the support arm 142 in a manner allowing the display 140 to tilt relative to the handlebar 106 or the support arm 142, such as to orient the display 140 towards the user during exercise.

The display 140 may rotate about one or more axes. For example, the display 140 may rotate about a first axis 144 to tilt the display 140 up and down relative to the handlebar 106. In some embodiments, the display 140 may rotate about a second axis 146 to pan the display 140 left and right relative to the handlebar 106. The first axis 144 may be parallel to the Y-axis, perpendicular to the Z-axis, lie within the XY plane formed by the X-axis and the Y-axis, or be parallel to the XY plane, among others. In some embodiments, at least a portion of the support arm 142 may define a vertical plane, with the first axis 144 extending perpendicular or generally perpendicular the vertical plane defined by the support arm 142. The second axis 146 may be parallel to the Z-axis, perpendicular to the Y-axis, lie within the YZ plane formed by the Y-axis and the Z-axis, or be parallel to the YZ plane, among others. In some embodiments, the first axis 144 may be a horizontal axis or a generally horizontal axis, and the second axis 146 may be a vertical axis or a generally vertical axis.

Figure 2:
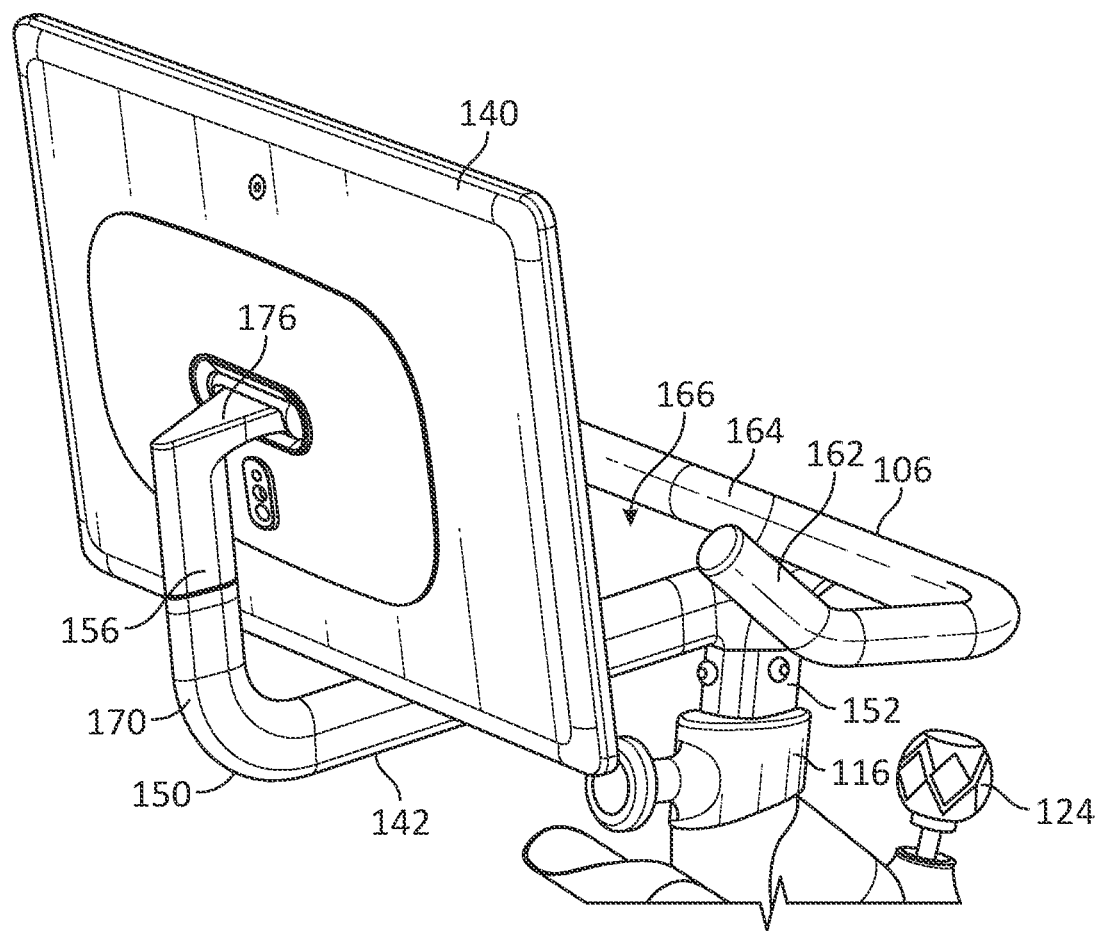
FIG. 2 illustrates a handlebar assembly of the exercise device of FIG. 1 in accordance with an embodiment of the disclosure.

FIG. 2 illustrates a perspective view of a handlebar assembly in accordance with an embodiment of the disclosure. Referring to FIGS. 1 and 2, the display 140 may be mounted to the exercise device 100 via a handlebar assembly 150. The handlebar assembly 150 may be configured as a single unit for attachment to the exercise device 100. For example, the handlebar assembly 150 may include a boss 152 configured for attachment to the handlebar post 116. In this manner, the handlebar assembly 150 may be attached to the exercise device 100 during original assembly of the exercise device 100, or the handlebar assembly 150 may be provided as a replacement part. In some embodiments, legacy exercise devices may be retrofitted with the handlebar assembly 150 to take advantage of one or more upgraded features of the handlebar assembly 150 compared to existing units.

As shown, the handlebar assembly 150 may include the handlebar 106, the support arm 142 extending from the handlebar 106, and a neck 156 extending from the support arm 142. As shown, the handlebar 106 may include a pair of bar ends 162 and one or more bars 164 extending between the pair of bar ends 162. The various bars 164 and bar ends 162 of the handlebar 106 may provide a plurality of handholds for the user during exercise. For example, a main bar 164 may provide a straight bar section between the pair of bar ends 162. The pair of bar ends 162 may extend forwardly towards the neck 156. The bar ends 162 may extend upwardly away from the support arm 142, such as gradually or in a stepped linear fashion. Depending on the application, the bar ends 162 may extend parallel or generally parallel to each other. In some embodiments, the pair of bar ends 162 may define a space 166 bounded by the bar ends 162. A secondary bar 164 may form a loop with the main bar 164 and extend upwardly away from the support arm 142, similar to the pair of bar ends 162.

The user may grasp the handlebar 106 at the various bars as desired for comfort and convenience. For instance, the user may grasp the main bar 164 to position the user in an upright seated position. The user may grasp the bar ends 162 to position the user in a more forward, bent-over position. Grasping the secondary bar 164 may position the user somewhere between the upright seated position and the forward, bent-over position. Moving from the main bar 164 to the secondary bar 164 may supinate the user's forearm, such as from a full pronation of the forearm when grasping the main bar 164 to a position between full pronation and a natural position of the forearm when grasping the secondary bar 164. Moving from the secondary bar 164 to the bar ends 162 may further supinate the user's forearm, such as to a natural position of the forearm when grasping the bar ends 162. Moving from the main bar 164 to the secondary bar 164, and from the secondary bar 164 to the bar ends 162, may widen the user's hold on the handlebar 106. In like manner, moving from the bar ends 162 to the secondary bar 164, and from the secondary bar 164 to the main bar 164, may narrow the user's hold on the handlebar 106. In this manner, the user may vary a hold width, forearm position, and posture as desired based on the grasping position with the handlebar 106.

The support arm 142 may extend from the main bar 164 of the handlebar 106. In some embodiments, the support arm 142 may extend generally orthogonal from the main bar 164 and from the centerline of the main bar 164. As shown, the handlebar 106 is mirrored across the support arm 142, although other configurations are contemplated. The support arm 142 may have a length extending between the handlebar 106 and a terminal end 170. The terminal end 170 may be curved, such as upwardly towards vertical. In some embodiments, the support arm 142 is hollow to allow one or more cables 172 (e.g., a data cable, a voice cable, etc.) to extend through the support arm 142, as explained below.

The neck 156 may connect the display 140 to the handlebar 106. For instance, the neck 156 may include a mount 176 that attaches to the display 140. The mount 176 may be a cantilevered arm to space the display 140 away from the neck 156, such as to accommodate tilting of the display 140 up and down about the first axis 144. As a result, the display 140 may be tilted to one of a plurality of positions relative to the neck 156 to position the display 140 as desired by a user, as explained below. In some embodiments, the neck 156 may be rotatably coupled to the support arm 142 such that at least a portion of the neck 156 is rotatable relative to the handlebar 106 to rotate the display 140 about the second axis 146. For example, the neck 156 may include a rotating mechanism similar to the rotating device disclosed in U.S. patent application Ser. No. 16/933,961 entitled "EXERCISE DEVICE ROTATING DISPLAY MECHANISM SYSTEMS AND METHODS," which is hereby incorporated herein by reference in its entirety.

Figure 3:
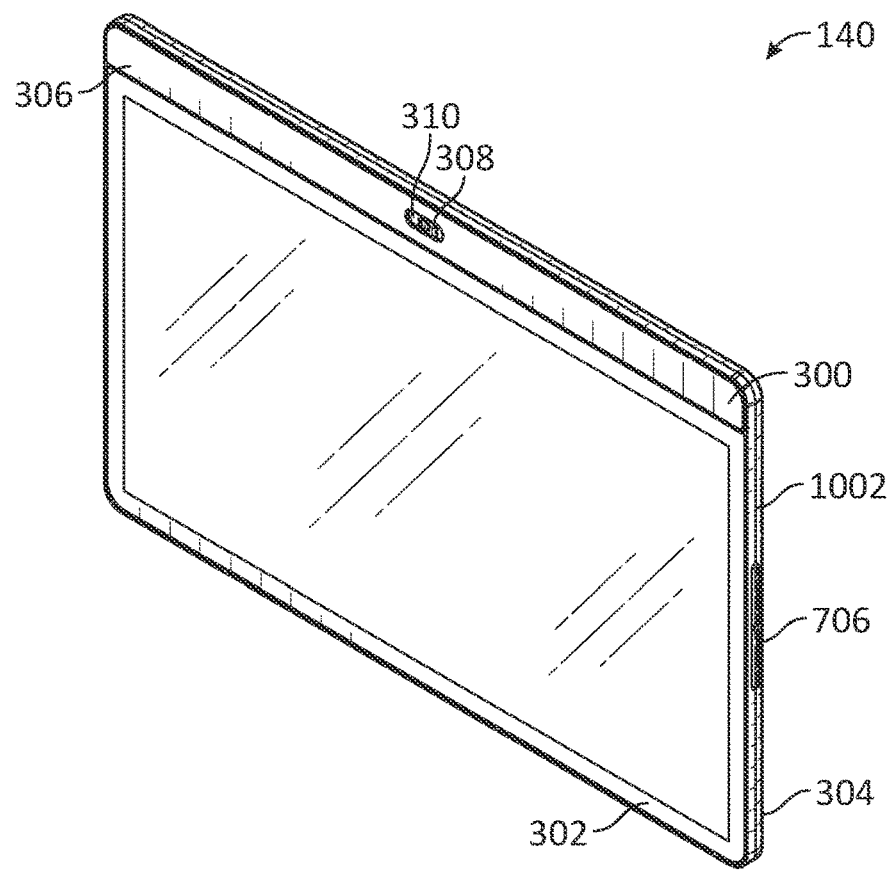
FIG. 3 illustrates a front perspective view of a display in accordance with an embodiment of the disclosure.
Figure 4:
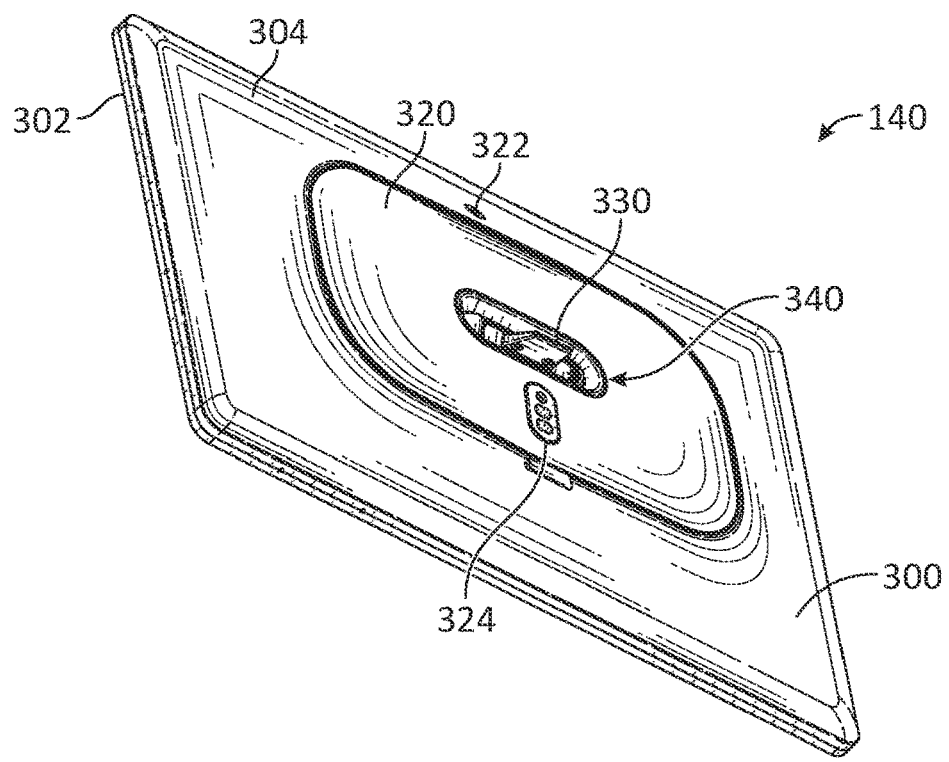
FIG. 4 illustrates a rear perspective view of the display in accordance with an embodiment of the disclosure.

FIG. 3 illustrates a front perspective view of the display 140 in accordance with an embodiment of the disclosure. FIG. 4 illustrates a rear perspective view of the display 140 in accordance with an embodiment of the disclosure. The display 140 may include a housing 300 with a front shell 302 and a back shell 304 coupled together. Referring to FIG. 3, the display 140 may include a front speaker panel 306 and a camera 308 connected to the front shell 302 and integrated with the front speaker panel 306. The display 140 may include a privacy slider 310 associated with the camera 308 to selectively cover the camera 308 as desired by a user. For example, the privacy slider 310 may be slid over the camera 308 to block a field of view of the camera 308 for privacy. The privacy slider 310 may be removed or slid away from the camera 308 when use of the camera 308 is desired. As shown, the front speaker panel 306 extends along an upper portion of the display 140 to limit sweat or other liquid buildup within the front speaker panel 306. Referring to FIG. 4, the display 140 may include a rear speaker panel 320, a power button assembly 322, and one or more IO ports 324 connected to the back shell 304. As shown in FIG. 4, the display 140 may include a mounting system 330 configured to secure the display 140 to the mount 176. The mounting system 330 may be configured to rotate the display 140 relative to the mount 176, such as tilting the display 140 up and down relative to the mount 176. As shown, at least a portion of the mounting system 330 may extend through the housing 300. For example, the back shell 304 may include an aperture 340 disposed therein. One or more portions of the mounting system 330 may extend or pass through the aperture 340 of the housing 300 to connect the mounting system 330 to the mount 176, as detailed more fully below.

Figure 5B:
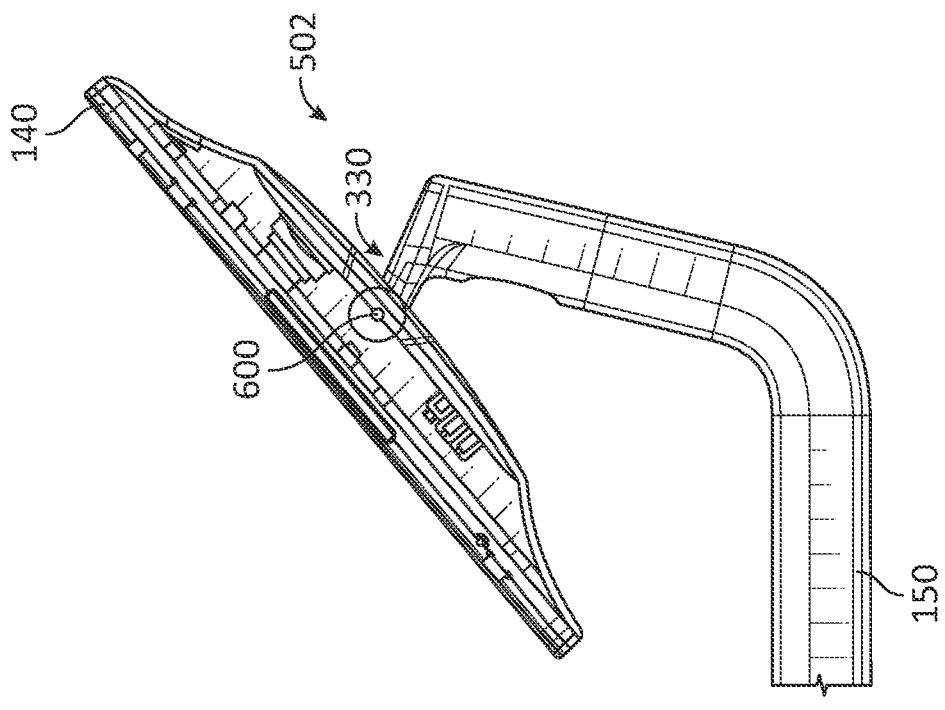
FIG. 5B illustrates a side view of the display of FIG. 3A in a second position relative to the handlebar assembly in accordance with an embodiment of the disclosure.
Figure 5A:
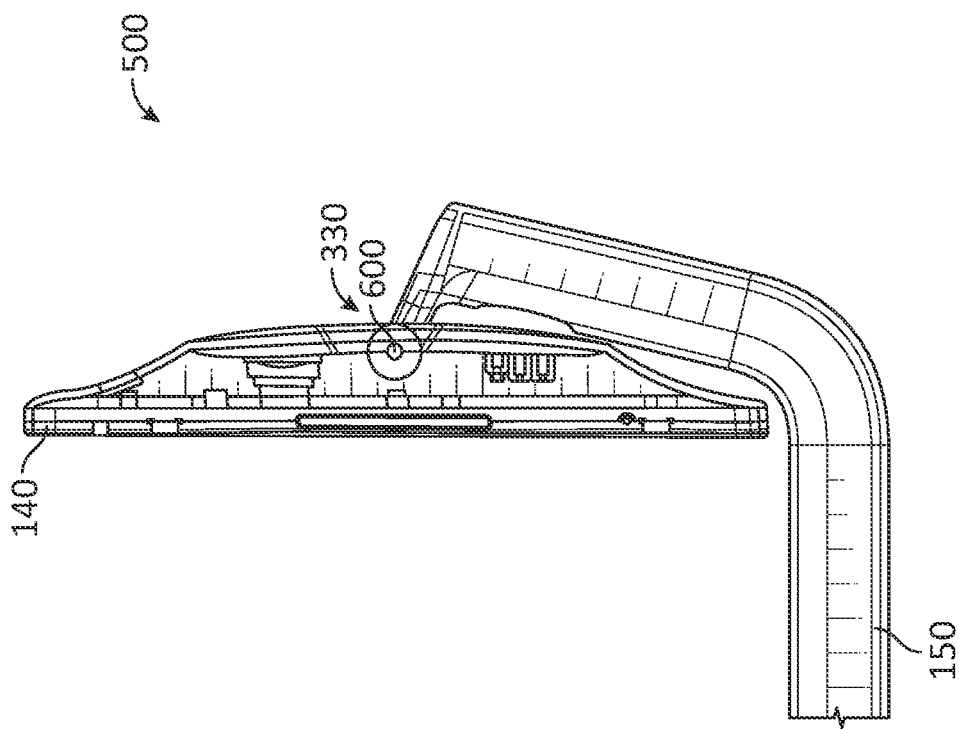
FIG. 5A illustrates a side view of a display in a first position relative to a handlebar assembly in accordance with an embodiment of the disclosure.

FIG. 5A illustrates a side view of the display 140 in a first position 500 relative to the handlebar assembly 150 in accordance with an embodiment of the disclosure. FIG. 5B illustrates a side view of the display 140 in a second position 502 relative to the handlebar assembly 150 in accordance with an embodiment of the disclosure. Referring to FIGS. 5A and 5B, the display 140 may be tilted via the mounting system 330 to one of a plurality of positions to orient the display 140 as desired. For example, the display 140 may be tilted down to the first position 500 to orient the display 140 downwards (e.g., downwardly towards the handlebar assembly 150), such as to orient the display 140 towards a shorter user of the exercise device 100. Conversely, the display 140 may be tilted up to the second position 502 to orient the display 140 upwards (e.g., upwardly away from the handlebar assembly 150), such as to orient the display 140 towards a taller user of the exercise device 100. The display 140 may be positioned in any position between the first position 500 and the second position 502 to orient the display 140 as desired within its tilting range of motion.

Figure 6:
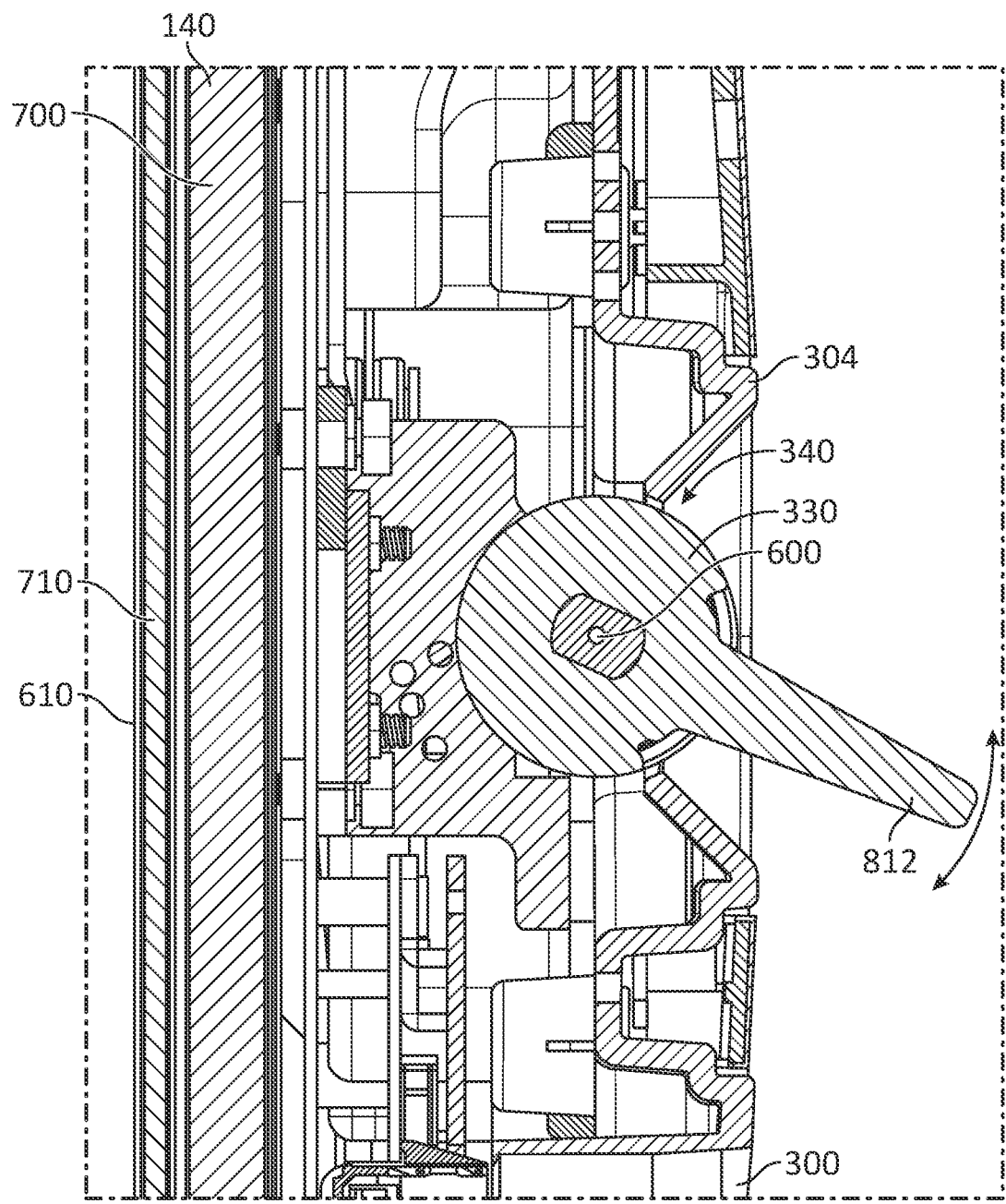
FIG. 6 illustrates a cross-sectional view of the display in accordance with an embodiment of the disclosure.

FIG. 6 illustrates a cross-sectional view of the display 140 in accordance with an embodiment of the disclosure. As shown in FIG. 6, the mounting system 330 may be positioned at least partially within the housing 300 of the display 140. As a result, and referring to FIGS. 5A, 5B, and 6, the mounting system 330 may define a hinge axis 600 for the display 140. The hinge axis 600 may be the first axis 144 described above. The display 140 may rotate about the hinge axis 600 to tilt the display 140 up and down. For example, rotation of the display 140 about the hinge axis 600 in a first direction (e.g., clockwise in FIGS. 5A and 5B) may tilt the display 140 upwards to the second position 502. Similarly, rotation of the display 140 about the hinge axis 600 in a second direction (e.g., counterclockwise in FIGS. 5A and 5B) may tilt the display 140 downwards to the first position 500. As shown, the hinge axis 600 may be defined internal to the display 140 (e.g., internal to the housing 300). Such examples are illustrative only, and the hinge axis 600 may be defined external to the display 140 in other configurations.

The positioning of the hinge axis 600 may facilitate tilting of the display 140. For example, the hinge axis 600 may be located near the center of gravity of the display 140 (e.g., as close to the center of gravity of the display 140 as possible). Depending on the application, the center of gravity of the display 140 may be biased (e.g., heavily) towards the front of the display 140. For example, the components of the display 140 may bias the center of gravity towards a front surface 610 of the display 140. Locating the hinge axis 600 near the center of gravity of the display 140 may reduce the likelihood of the display 140 changing positions during use of the exercise device 100, such as during high vibration scenarios. In some embodiments, the hinge axis 600 may be located internal to the display 140 (e.g. internal to the housing 300) to position the hinge axis 600 near the center of gravity of the display 140. Other configurations may also facilitate easy tilting of the display 140 by the user due to increased leverage. The distance between the hinge axis 600 and the center of gravity of the display 140 may be between about 0 mm and about 35 mm, such as between about 15 mm and about 35 mm, between about 25 mm and about 35 mm, between about 26 mm and about 29 mm, or the like. In some embodiments, the hinge axis 600 may be located at the center of gravity. The distance between the hinge axis 600 and the front surface 610 of the display 140 may be between about 30 mm and about 45 mm, such as between about 35 mm and about 40 mm, between about 39 mm and about 40 mm, or the like.

Figure 7:
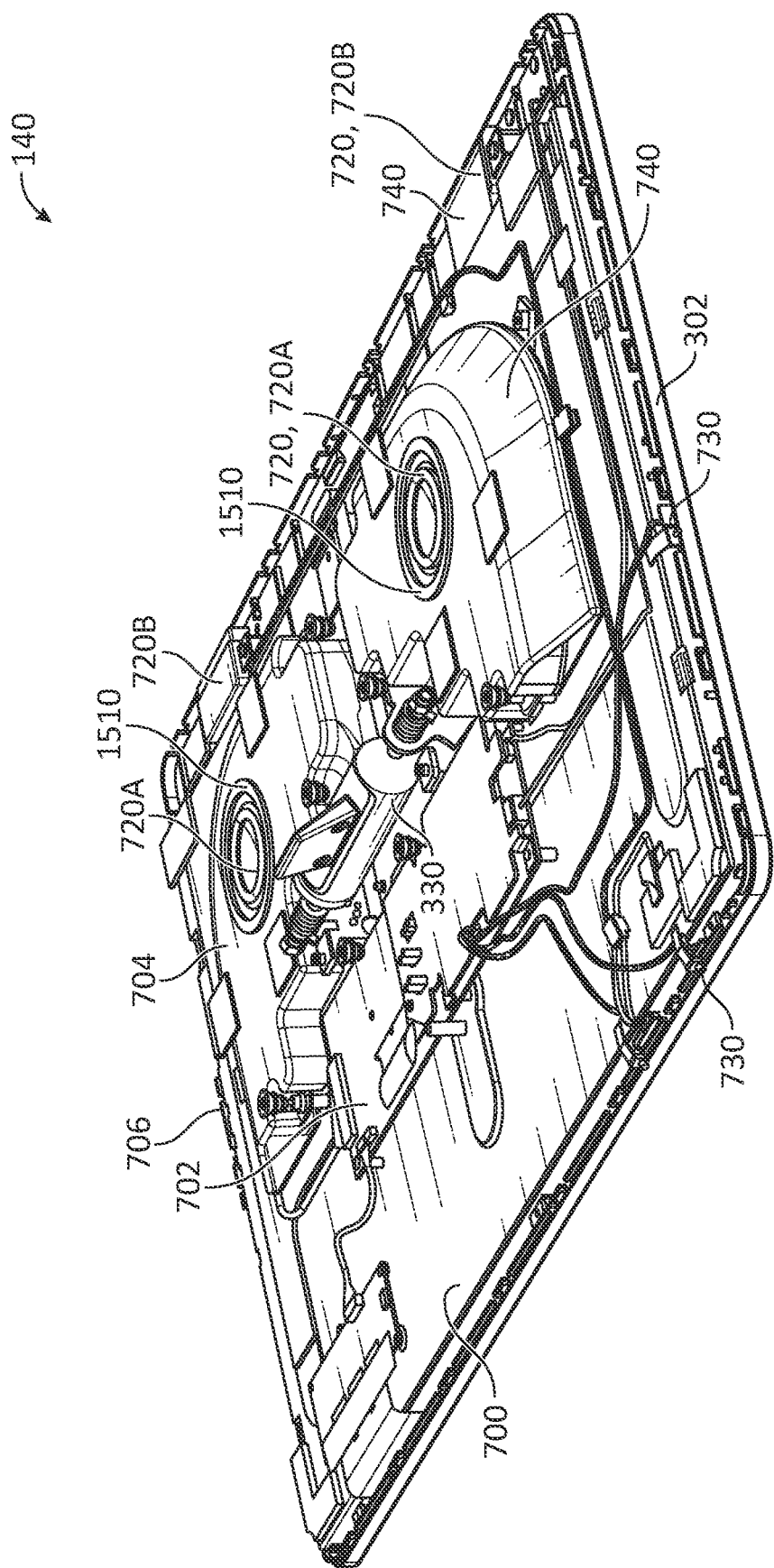
FIG. 7 illustrates a rear view of the display with a back shell removed for illustration purposes in accordance with an embodiment of the disclosure.

FIG. 7 illustrates a rear view of the display 140 with the back shell 304 removed for illustration purposes in accordance with an embodiment of the disclosure. As shown in FIG. 7, the display 140 may include a mounting plate 700 secured to the front shell 302. The mounting plate 700 may support one or more components of the display 140. For example, the mounting plate 700 may support the mounting system 330, one or more printed circuit board assemblies (PCBAs) 702, an audio system 704, and a volume control 706, among other components of the display 140. In some embodiments, the mounting plate 700 may support a display screen 710 (e.g., an LCD screen, an LED screen, or the like) (see FIG. 6). In some embodiments, the back shell 304 may be connected, at least partially, to the mounting plate 700. The mounting plate 700 may provide the structural support needed for each of the components connected thereto. For example, the mounting plate 700 may have sufficient rigidity and strength to provide a sure foundation for the mounting system 330, the display screen 710, the PCBAs 702, the audio system 704, and the volume control 706, among others. As shown, the mounting plate 700 may extend along a majority of the front shell 302, such as greater than 50% of the front shell 302, greater than 60% of the front shell 302, greater than 70% of the front shell 302, greater than 80% of the front shell 302, greater than 90% of the front shell 302, greater than 95% of the front shell 302, or the like.

The one or more PCBAs 702 may include circuitry and/or components configured to control operation of the display 140. For example, the one or more PCBAs 702 may include one or more drivers, chipsets, or other logic devices configured to control operation of the display screen 710, the audio system 704, or other components or systems of the display 140 (e.g., a video system). In some embodiments, the one or more PCBAs 702 may include one or more cards dedicated to a particular system of the display 140. For instance, the one or more PCBAs 702 may include one or more graphics cards, one or more sound cards, one or more CPU cards, and the like.

The audio system 704 may include one or more components configured to produce and/or receive (pick up) sound. For example, the audio system 704 may include one or more speaker drivers 720 and one or more microphones 730. In the illustrative embodiment of FIG. 7, the audio system 704 includes one or more low frequency drivers 720A (e.g., a pair of low frequency drivers 720A) and one or more high frequency drivers 720B (e.g., a pair of high frequency drivers 720B), although other configurations are contemplated. Each driver may be housed within a respective enclosure 740 secured to the mounting plate 700 and/or the front shell 302. The enclosures 740 may be designed to provide a desired frequency response. As shown, the one or more low frequency drivers 720A may be directed out a back side of the display 140. The one or more high frequency drivers 720B may be directed out a front side of the display 140. As a result, the one or more high frequency drivers 720B may face the user of the exercise device 100 to take advantage of the directional nature of high frequency sound. The one or more low frequency drivers 720A may face away from the user for space efficiency, such as to avoid having a large speaker bar facing the user.

Figure 8A:
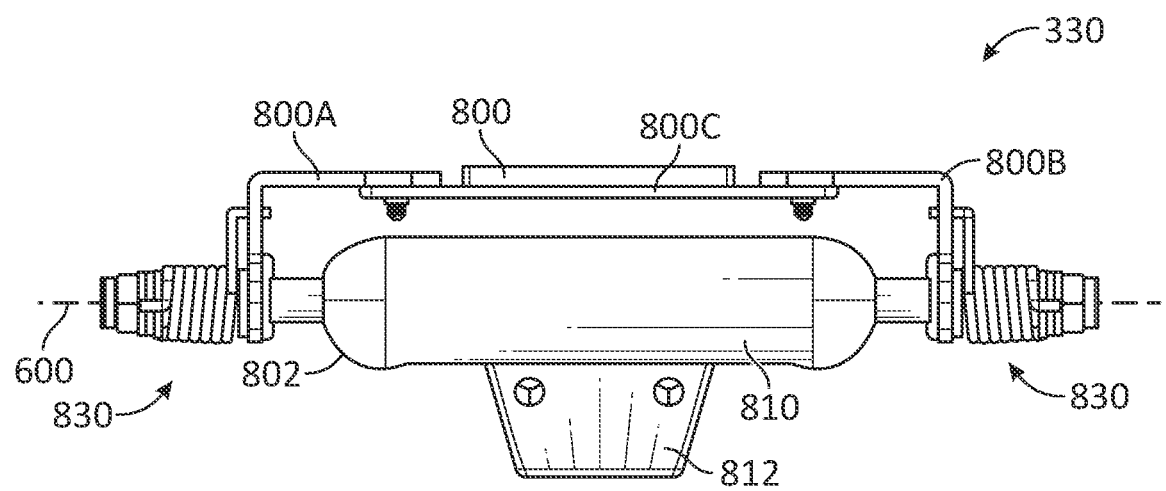
FIGS. 8A-8C illustrate top, front, and side views of a mounting system in accordance with an embodiment of the disclosure.
Figure 8B:
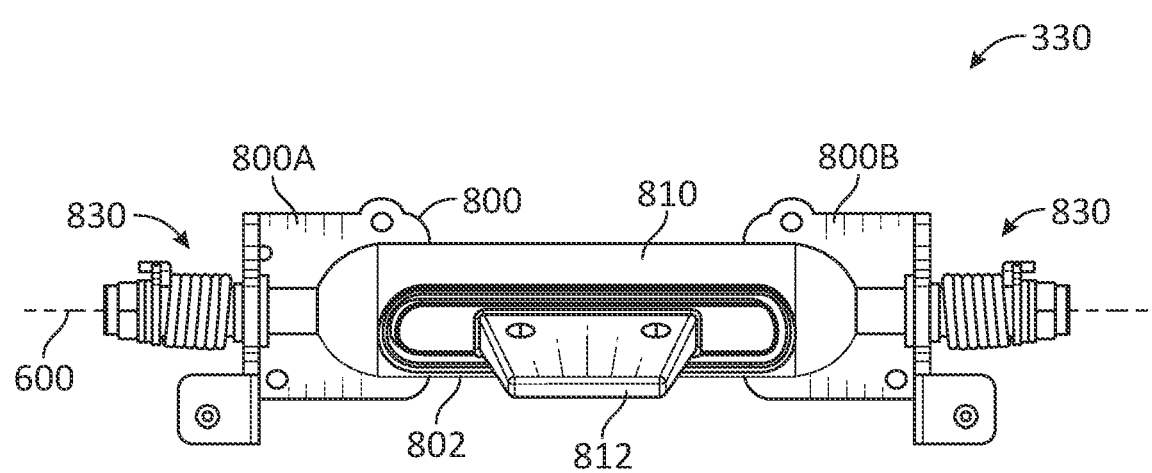
Figure 8C:
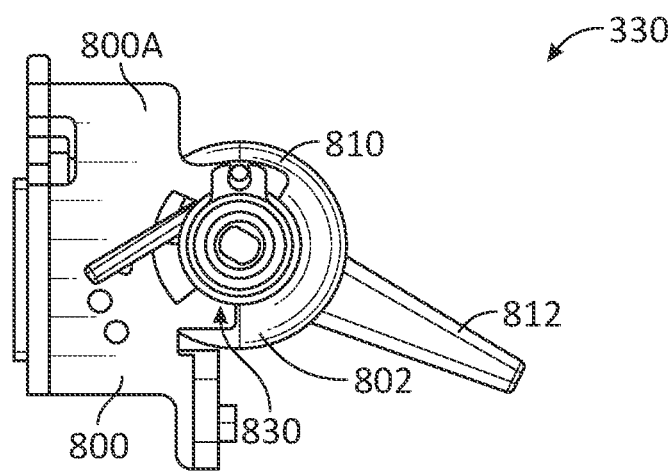

FIGS. 8A-8C illustrate top, front, and side views of mounting system 330 in accordance with an embodiment of the disclosure. Referring to FIGS. 8A-8C, the mounting system 330 may include a bracket 800 and a hinge 802 rotatably secured to the bracket 800. The bracket 800 may be secured to the mounting plate 700 and include one or more bracket members secured together, such as a left bracket member 800A secured to a right bracket member 800B via a center bracket member 800C, although other configurations are contemplated. The hinge 802 may include a barrel 810 and a tongue 812 extending from the barrel 810. The barrel 810 may be securable to the display 140 (or other device), such as via the bracket 800, and configured to rotate the display 140. The barrel 810 may define the hinge axis 600 for the display 140 when the barrel 810 is rotatably secured to the display 140. For example, the barrel 810 may be rotatably secured within the housing 300 of the display 140 to define the hinge axis 600 internal to the housing 300 (see FIG. 6), although other configurations are contemplated. For example, the barrel 810 may be rotatably secured to the housing 300 to define the hinge axis 600 external to the housing 300.

The tongue 812 may extend from the barrel 810 for connection to the mount 176. For example, as illustrated in FIG. 6, the tongue 812 may extend or otherwise pass through the aperture 340 of the back shell 304 of the display 140. In some embodiments, the tongue 812 may be configured to extend from the display 140 for connection to the mount 176. As detailed below, the tongue 812 may pass through the aperture 340 of the back shell 304 for connection to the mount 176. The tongue 812 may include many configurations to facilitate connection of the tongue 812 to the mount 176. For example, the tongue 812 may include a duckbill shape, although other suitable shapes are contemplated. For instance, the tongue 812 may taper in thickness and width with distance away from the barrel 810. Such configurations may facilitate connection of the tongue 812 with the mount 176. For instance, the duckbill shape may facilitate insertion of the tongue 812 within the mount 176, as well as proper positioning of the tongue 812 within the mount 176 for subsequent securement. For example, once the tongue 812 is inserted into the mount 176, one or more fasteners 820 may be inserted within the mount 176 and the tongue 812 to secure the mounting system 330 to the mount 176.

With continued reference to FIGS. 8A-8C, the mounting system 330 may include a friction hinge 830 operable to releasably hold the barrel 810 at a desired position. For instance, the friction hinge 830 may allow the barrel 810 to rotate about the hinge axis 600 to a desired position, such as to orient the display 140 as desired. Once the barrel 810 is rotated to a desired position, the friction hinge 830 may hold the barrel 810 in position. As a result, the display 140 may be held in a desired orientation, such as during use of the exercise device 100. Although a friction hinge is shown and described, the mounting system 330 may include other hinge structures operable to hold the hinge 802 (e.g., the barrel 810) at a desired position. For example, and without limitation, the mounting system 330 may include a locking hinge configured to selectively lock the hinge 802 at a desired position.

FIG. 9 illustrates an exploded view of one side of the mounting system 330 in accordance with an embodiment of the disclosure. The other side of the mounting system 330 may be configured similarly or differently. For example, the other side of the mounting system 330 may be a mirror image of side illustrated in FIG. 9. Referring to FIG. 9, the friction hinge 830 may include a torsion spring 832 and a friction mechanism 834. In some embodiments, the friction hinge 830 may include a stop washer 836, a pair of bushings 838, a spacer 840, a spring spacer 842, an anti-rotation washer 844, and a nut 846. The barrel 810 includes a shaft 850 extending therefrom, the shaft 850 defining the hinge axis 600. The shaft 850 may include a non-circular cross-section to tie rotation of one or more components of the friction hinge 830 with rotation of the shaft 850, as explained below. The left bracket member 800A may include a first hole 860, a second hole 862, a plurality of apertures 864, and a slot 866 disposed therein. As shown, the slot 866 may include an arcuate shape that follows an arc angle around the first hole 860. The plurality of apertures 864 may also be disposed along an arc angle around the first hole 860, with the slot 866 disposed between the first hole 860 and the plurality of apertures 864. The right bracket member 800B may include a similar configuration.

With continued reference to FIG. 9, each of the stop washer 836, spacer 840, and anti-rotation washer 844 may include a shape that indexes with the non-circular shape of the shaft 850. For example, each of the stop washer 836, spacer 840, and anti-rotation washer 844 may include a central bore of a non-circular shape complementary to the non-circular shape of the shaft 850 to limit rotation of the stop washer 836, spacer 840, and anti-rotation washer 844 relative to the shaft 850. As a result, rotation of the shaft 850 will rotate the stop washer 836, spacer 840, and anti-rotation washer 844 correspondingly.

The stop washer 836 may include a bracket 870 that interfaces with the slot 866 of the left bracket member 800A. For example, once assembled the bracket 870 of the stop washer 836 may be positioned at least partially within the slot 866 such that rotation of the stop washer 836 moves the bracket 870 within the slot 866. The bracket 870 may engage the left bracket member 800A at the ends of the slot 866 to define first and second stop positions of the mounting system 330. For instance, rotation of the barrel 810 in a first direction, such as from tilting the display 140 up, may cause the bracket 870 of the stop washer 836 to ride within the slot 866 of the left bracket member 800A until the bracket 870 engages a first portion of the left bracket member 800A, limiting further rotation of the barrel 810 in the first direction and defining the first stop position of the mounting system 330. In like manner, rotation of the barrel 810 in an opposite second direction, such as from tilting the display 140 down, may cause the bracket 870 of the stop washer 836 to ride within the slot 866 of the left bracket member 800A until the bracket 870 engages a second portion of the left bracket member 800A, limiting further rotation of the barrel 810 in the second direction and defining the second stop position of the mounting system 330.

Each bushing 838 may include a tab 872 that interfaces with the second hole 862 of the left bracket member 800A. For example, the tab 872 of each bushing 838 may be positioned at least partially within the second hole 862 of the left bracket member 800A to limit rotation of the bushings 838 relative to the left bracket member 800A. As shown, the anti-rotation washer 844 may include a notch 874 disposed therein to receive a portion of the torsion spring 832.

For example, the torsion spring 832 may include a first end 880 and a second end 882. The first end 880 may be positioned within one of the plurality of apertures 864 of the left bracket member 800A, and the second end 882 may be positioned within the notch 874 of the anti-rotation washer 844. As a result, rotation of the anti-rotation washer 844 with the shaft 850 of the barrel 810 may adjust the tension of the torsion spring 832. For example, rotation of the shaft 850 in the first direction may increase tension of the torsion spring 832 via the anti-rotation washer 844. Similarly, rotation of the shaft 850 in the second direction may decrease tension of the torsion spring 832 via the anti-rotation washer 844. The tension of the torsion spring 832 may also be adjusted based on receipt of the first end 880 of the torsion spring 832 within one of the plurality of apertures 864. For instance, the first end 880 of the torsion spring 832 may be positioned within a successive aperture of the plurality of apertures 864 to increase the tension of the torsion spring 832. In like manner, the first end 880 of the torsion spring 832 may be positioned within a preceding aperture of the plurality of apertures 864 to decrease the tension of the torsion spring 832. As a result, the mounting system 330 may be adjustable to adapt the mounting system 330 to displays (or other devices) of different weights, sizes, or configurations. In some embodiments, the left bracket member 800A and/or the right bracket member 800B may include a single aperture 864 for a single preload setting of the torsion spring 832.

The torsion spring 832 may facilitate rotation of the display 140 about the hinge axis 600. For example, the torsion spring 832 may provide a torque balancing the weight of the display 140 about the hinge axis 600. The torsion spring 832 and/or the friction mechanism 834 may limit undesired movement of the display 140. For instance, the torsion spring 832 and/or friction mechanism 834 may limit bouncing of the display 140 during use of the exercise device 100 (e.g., during high speed or high vibration exercises).

The friction mechanism 834 may frictionally hold the barrel 810 in the position set by the user. For example, after user rotation of the display 140 to a desired orientation, the friction mechanism 834 may hold the barrel 810 in the set position. The friction mechanism 834 may include a plurality of spring washers 886 each having a conical shell that can be loaded along its axis either statically or dynamically. Depending on the application, the spring washers 886 may be a coned disc spring, a conical spring washer, a disc spring, a Belleville spring, a Belleville washer, or a cupped spring washer, among others. The spring washers 886 may include many profiles and configurations. For example, the spring washers 886 may be ribbed. The spring washers 886 may be stacked in many configurations (e.g., in alternate or alternating orientations, together in the same orientation, or any combination thereof) to achieve a desired spring rate and friction characteristic.

The friction hinge 830 may be assembled in many configurations. For example, the stop washer 836 may be placed on the shaft 850, followed by a first of the pair of bushings 838. The shaft 850 may then be inserted into the first hole 860 of the left bracket member 800A until the bracket 870 of the stop washer 836 seats at least partially within the slot 866 of the left bracket member 800A and the tab 872 of the first bushing 838 seats at least partially within the second hole 862 of the left bracket member 800A. A second of the pair of bushings 838 may then be placed on the shaft 850 until the tab 872 of the second bushing 838 seats at least partially within the second hole 862 of the left bracket member 800A and on the opposite side of the left bracket member 800A from the first bushing 838. The spacer 840 and spring spacer 842 may then be placed on the shaft 850, followed by the torsion spring 832, with the spring spacer 842 positioned within the coil of the torsion spring 832 and the first end 880 of the torsion spring 832 positioned within one of the plurality of apertures 864 of the left bracket member 800A. The anti-rotation washer 844 may then be placed onto the shaft 850, with the second end 882 of the torsion spring 832 positioned within the notch 874 of the anti-rotation washer 844. The spring washers 886 may then be placed onto the shaft 850 and the nut 846 threaded to the shaft 850 to secure everything together. The friction hinge 830 on the other side of the barrel 810 may be assembled similarly to the right bracket member 800B.

Figure 10A:
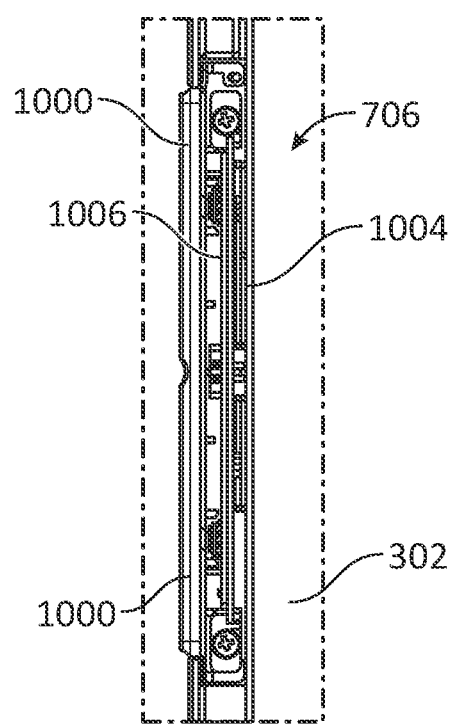
FIGS. 10A-10B illustrate top and perspective views of a volume control in accordance with an embodiment of the disclosure.
Figure 10B:
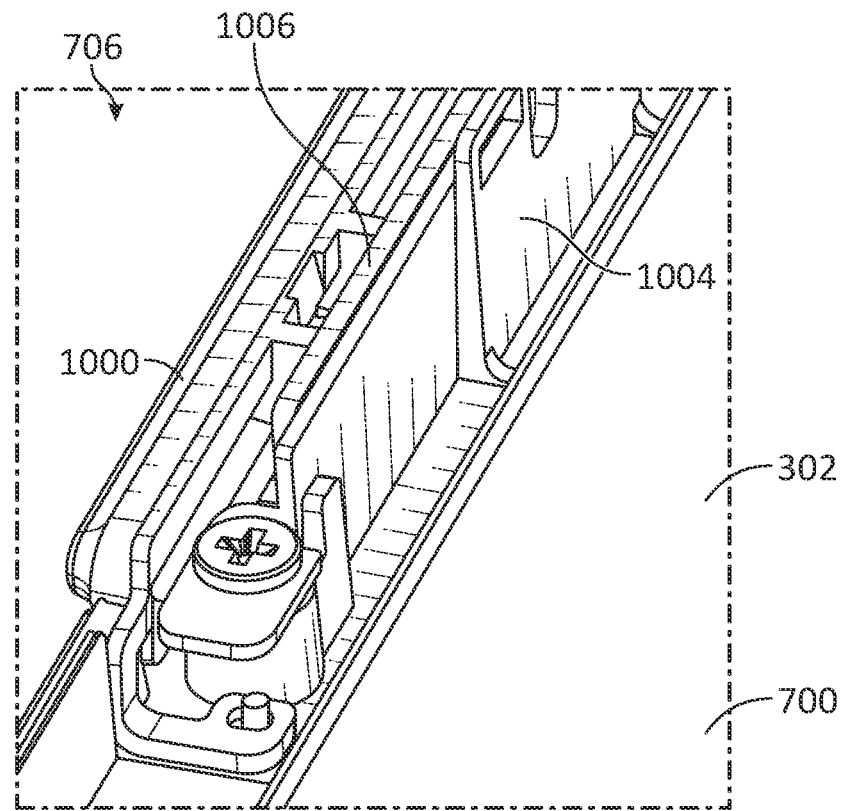

FIGS. 10A-10B illustrate top and perspective view of the volume control 706 in accordance with an embodiment of the disclosure. The volume control 706 may include a plurality of volume buttons 1000 and be centered on a parting line 1002 (see FIG. 3) between the front shell 302 and the back shell 304. As shown in FIGS. 10A-10B, the volume control 706 may include a support bracket 1004 supporting a PCBA 1006 perpendicular to the front shell 302. The support bracket 1004 may be mounted to the front shell 302, such as to the mounting plate 700 secured to the front shell 302. As a result, the volume buttons 1000 may hinge from the front shell 302.

Figure 11A:
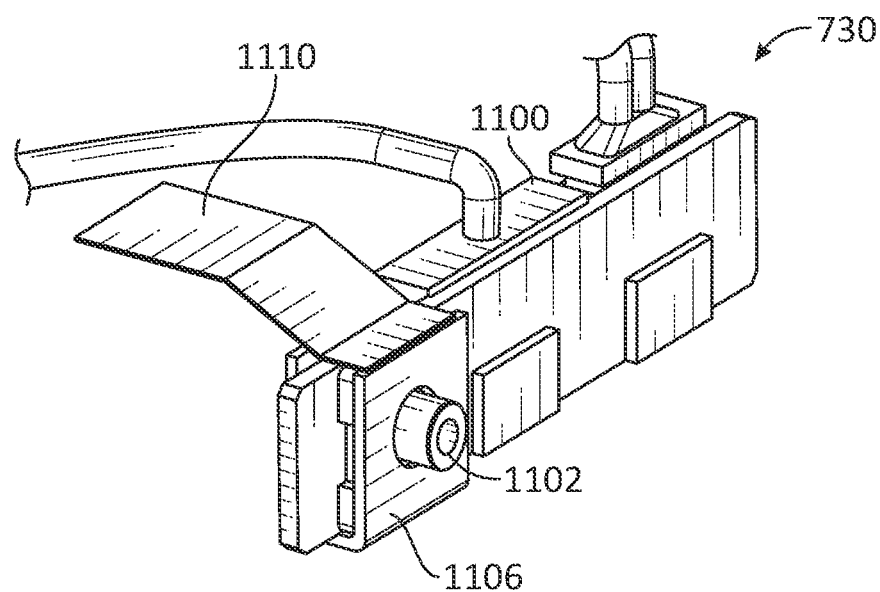
FIGS. 11A-11B illustrate perspective and cross-sectional views of a microphone port design in accordance with an embodiment of the disclosure.
Figure 11B:
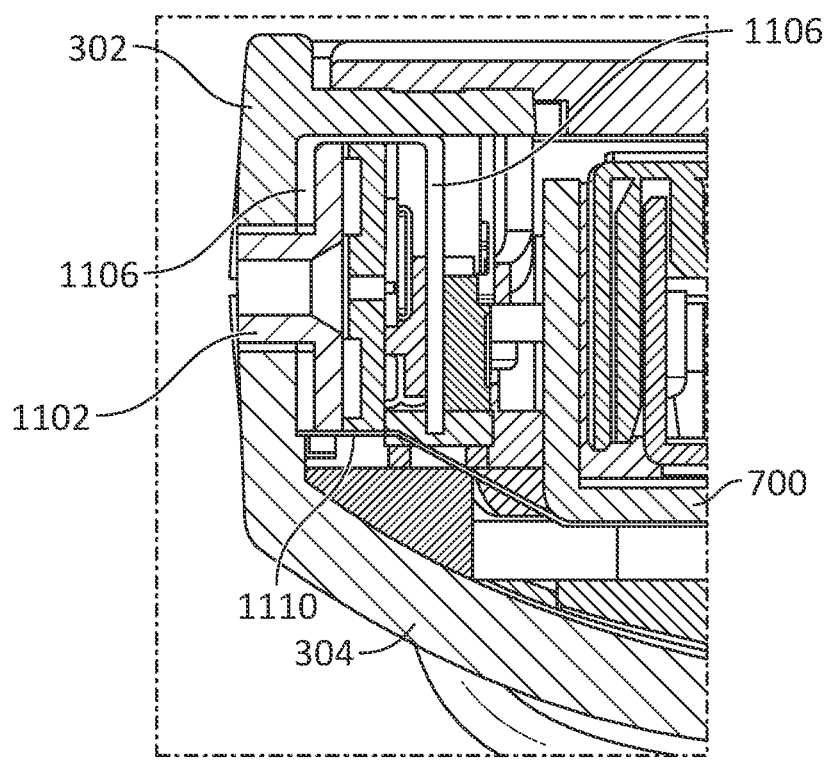

FIGS. 11A-11B illustrate perspective and cross-sectional views of a microphone port design in accordance with an embodiment of the disclosure. Referring to FIGS. 7 and 11A-11B, the one or more microphones may be disposed on the front shell 302. For example, the one or more microphones may be installed into the front shell 302 and then assembled to the back shell 304 when the back shell 304 is connected to the front shell 302. Referring to FIGS. 11A-11B, the microphone may include a PCBA 1100 and a microphone port 1102. One or more foam pieces 1106 may wrap around the microphone port 1102 to seal the microphone port 1102 to the front shell 302 and the back shell 304. For example, the one or more foam pieces 1106 may press against both the front shell 302 and the back shell 304 to seal the microphone port 1102 to the housing 300. In some embodiments, the microphone may include a piece of tape 1110 connected to the microphone port 1102 to facilitate assembly of the microphone to the front shell 302. For example, as shown in FIG. 11B, the tape 1110 may secure the microphone port 1102 to the mounting plate 700 to secure the microphone in proper position before assembly of the back shell 304 to the front shell 302.

Figure 12:
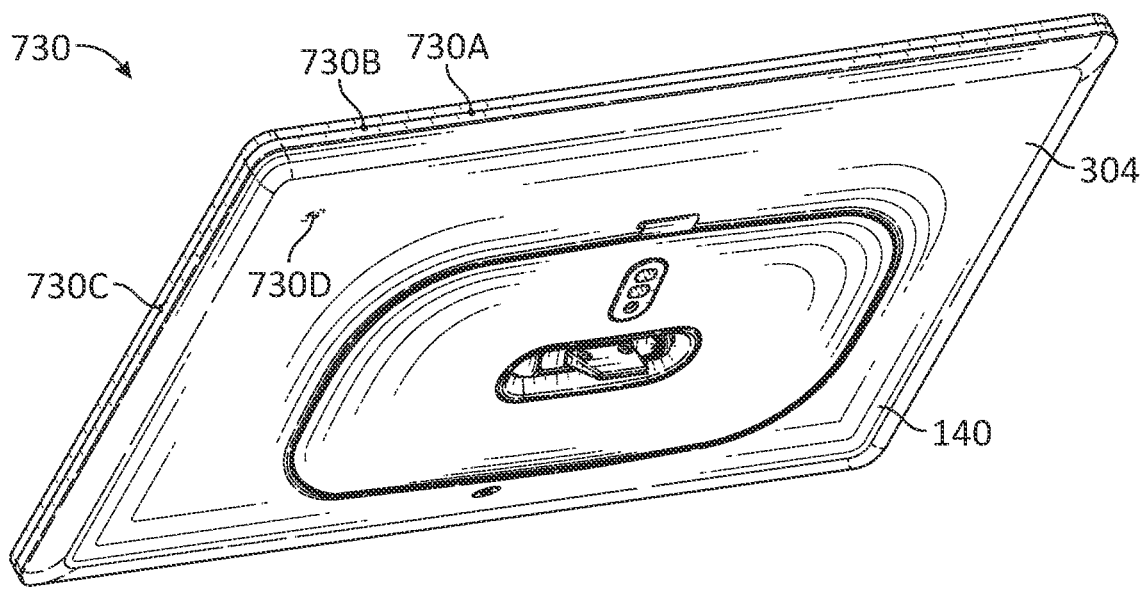
FIG. 12 illustrates a bottom rear perspective view of the display in accordance with an embodiment of the disclosure.

FIG. 12 illustrates a bottom rear perspective view of the display 140 in accordance with an embodiment of the disclosure. Referring to FIG. 12, the display 140 may include a plurality of microphones 730. In some embodiments, the display 140 may include a plurality of microphones 730 located at a corner of display 140. For example, the display 140 may include four microphones, with a first microphone 730A and a second microphone 730B positioned along the bottom edge of the display 140, a third microphone 730C positioned along an adjacent side edge of the display 140, and a fourth microphone 730D positioned on the back shell 304 of the display 140. This microphone layout and positioning (e.g., the distance between the microphones and the direction the microphones face) may accommodate a voice control feature of the display 140. For instance, the illustrated microphone layout and positioning may facilitate voice capture and recognition during workout sessions. The illustrated microphone layout and positioning may reduce interference and other undesirable sound characteristics.

Figure 13:
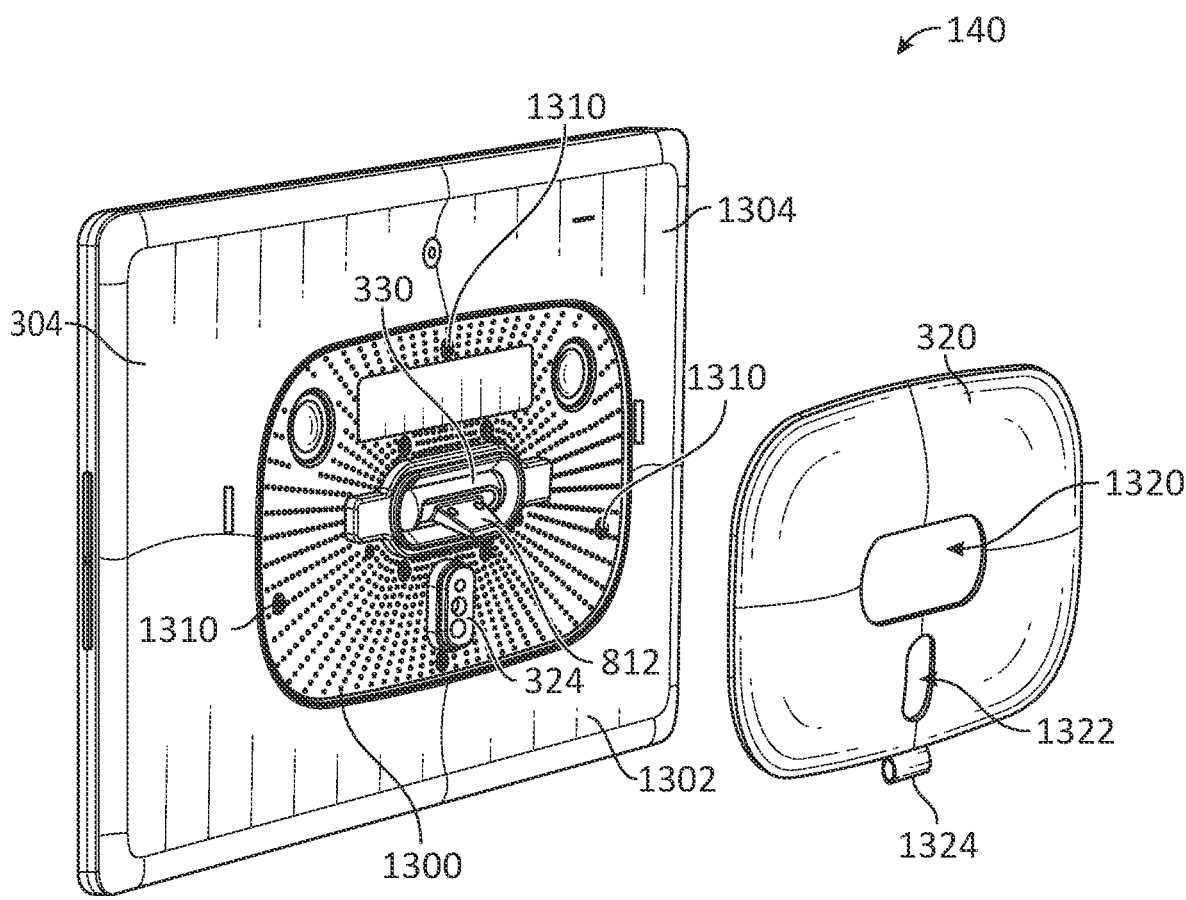
FIG. 13 illustrates an exploded view of a display in accordance with an embodiment of the disclosure.

FIG. 13 illustrates an exploded view of the display 140 in accordance with an embodiment of the disclosure. As shown, the back shell 304 of the display 140 may include a plurality of holes 1300 providing a thermal solution and/or an acoustic solution to the display 140. The holes 1300 may be arranged in a pattern to provide one or more functional and/or aesthetic characteristics. For instance, the holes 1300 may be arranged along a bottom half 1302 and an upper half 1304 of the back shell 304. The upper half 1304 of the back shell 304 may include a first number of holes 1300 disposed therein, and the bottom half 1302 of the back shell 304 may include a second number of holes 1300 disposed therein. The second number of holes 1300 may be greater than the first number of holes 1300, such that the bottom half 1302 of the back shell 304 includes a greater number of holes 1300 compared to the upper half 1304.

With continued reference to FIG. 13, the back shell 304 may be secured to the front shell 302 via one or more fasteners 1310. For example, a plurality of fasteners 1310 may secure the back shell 304 to the mounting plate 700. The fasteners 1310 may be disposed within the field/pattern of holes 1300. In some embodiments, the back shell 304 may be secured to the front shell 302 via one or more clip structures or other corresponding engagement structures arranged at the parting line between the back shell 304 and the front shell 302.

The rear speaker panel 320 may be configured to cover one or more features or components of the back shell 304. For instance, the rear speaker panel 320 may cover the one or more low frequency drivers 720A, the plurality of holes 1300, and the fasteners 1310 securing the back shell 304 to the front shell 302. In some embodiments, the rear speaker panel 320 may cover regulation information, serial/model number information, or other information on the back shell 304. As shown, the rear speaker panel 320 may include a first aperture 1320 and a second aperture 1322 disposed therein. The tongue 812 of the mounting system 330 may extend through the first aperture 1320, and the IO ports 324 may be accessed through the second aperture 1322 of the rear speaker panel 320. In some embodiments, the rear speaker panel 320 may include a pull tab 1324 to remove the rear speaker panel 320 from the back shell 304.

Figure 14:
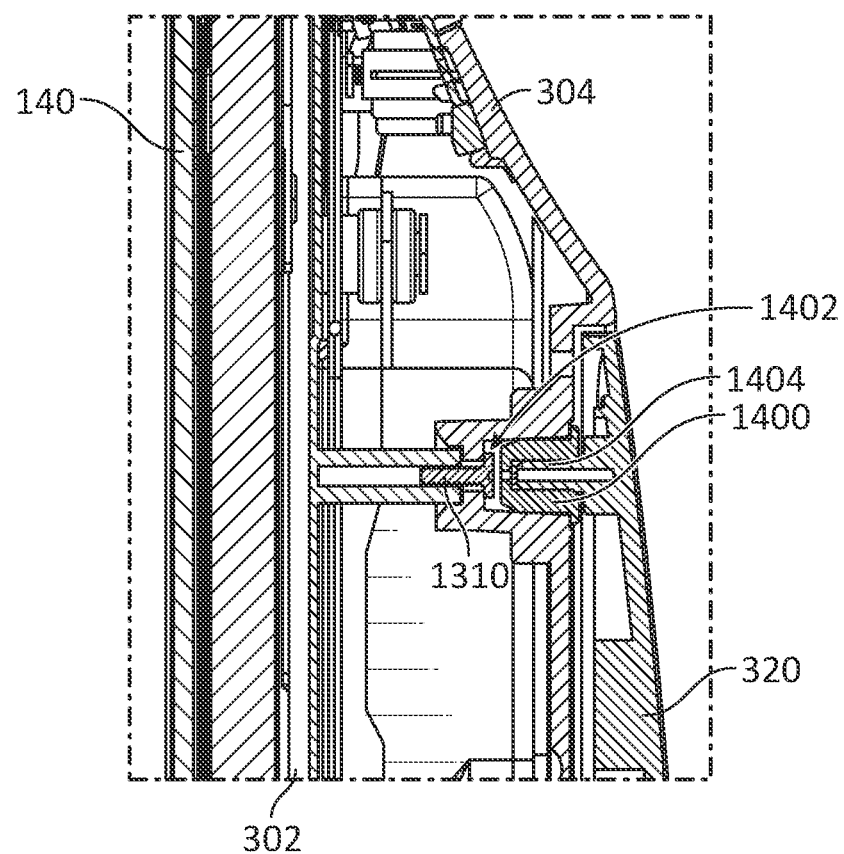
FIG. 14 illustrates a cross-sectional view of a rear speaker panel connected to the display in accordance with an embodiment of the disclosure.

FIG. 14 illustrates a cross-sectional view of the rear speaker panel 320 connected to the display 140 in accordance with an embodiment of the disclosure. As described herein, the rear speaker panel 320 may be removable from the back shell 304. For instance, one or more grommets 1400 (e.g., rubber grommets) may secure the rear speaker panel 320 to the back shell 304. The one or more grommets 1400 may be positioned within corresponding holes 1402 disposed in the back shell 304. In such embodiments, the rear speaker panel 320 may include one or more posts 1404. The one or more posts 1404 may be received within the grommets 1400 to secure the rear speaker panel 320 to the back shell 304. As shown in FIG. 14, the fasteners 1310 securing the back shell 304 to the front shell 302 may be positioned within the holes 1402. In such embodiments, receipt of the one or more grommets 1400 of the rear speaker panel 320 within the holes 1402 of the back shell 304 may conceal the fasteners 1310 securing the back shell 304 to the front shell 302. As a result, the grommets 1400 may include a dual function to both secure the rear speaker panel 320 to the back shell 304 and conceal the fasteners 1310 securing the back shell 304 and the front shell 302 together. To remove the rear speaker panel 320 from the back shell 304, the pull tab 1324 may be pulled until the rear speaker panel 320 (e.g., the posts of the rear speaker panel 320) release from the grommets 1400.

Figure 15:
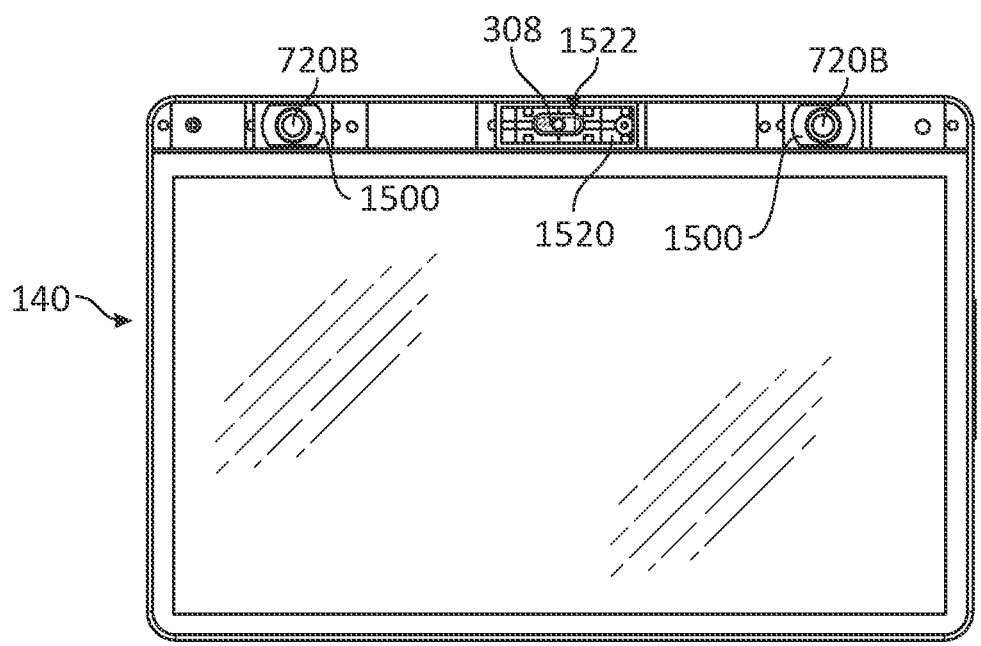
FIG. 15 illustrates a front view of the display with a front speaker panel removed for illustration purposes in accordance with an embodiment of the disclosure.

FIG. 15 illustrates a front view of the display 140 with the front speaker panel 306 removed for illustration purposes in accordance with an embodiment of the disclosure. With reference to FIGS. 3 and 15, the front speaker panel 306 may be configured to cover the one or more high frequency drivers 720B. The high frequency drivers 720B may be configured to manage vibration, water resistance, and sound directionality. For instance, as shown in FIG. 15, each high frequency driver 720B may include a foam sheet 1500. The foam sheet 1500 may be attached to a portion of the enclosure 740 housing the high frequency driver 720B or the foam sheet 1500 may wrap around the enclosure 740. The foam sheet 1500 may reduce vibration of the front speaker panel 306, limit fluid ingress into the high frequency driver 720B, seal the sound from the high frequency driver 720B, or any combination thereof. Referring to FIG. 7, each low frequency driver 720A may include a similar configuration. For example, each low frequency driver 720A may include one or more foam sheets 1510 to reduce vibration of the back shell 304, limit fluid ingress into the low frequency driver 720A, seal the sound from the low frequency driver 720A, or any combination thereof.

Referring to FIG. 15, the display 140 may include a near field communication (NFC) antenna 1520 disposed around the camera 308. The NFC antenna 1520 may include one or more cutouts 1522 to route the NFC antenna 1520 around the camera 308 and/or a fastener while still maximizing surface area. Positioning the NFC antenna 1520 around the camera 308 may allow for an intuitive, central location for NFC pairing, along with the camera 308 occupying the same space.

Figure 16:
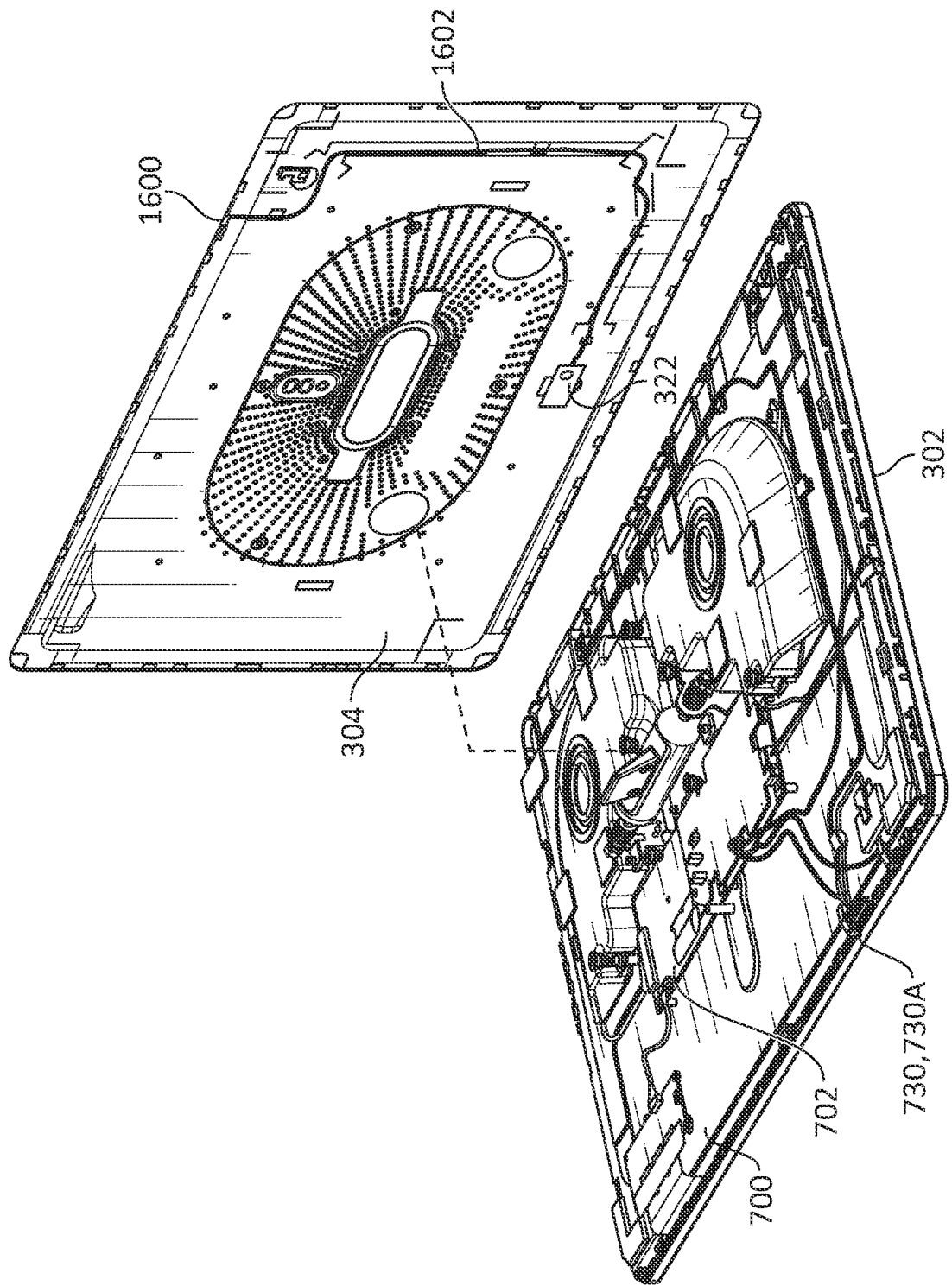
FIG. 16 illustrates a connection architecture between front and back shells of the display in accordance with an embodiment of the disclosure.

FIG. 16 illustrates a connection architecture between the front shell 302 and the back shell 304 of the display 140 in accordance with an embodiment of the disclosure. Referring to FIG. 16, the power button assembly 322 may be disposed on the back shell 304. To connect the power button assembly 322 to the PCBAs 702 connected to the mounting plate 700, the power button assembly 322 may interface with a microphone when the front shell 302 and the back shell 304 are connected. For instance, the back shell 304 may include a connector 1600 disposed thereon and located to interface with the first microphone 730A assembled to the front shell 302. A cable 1602 may run between the power button assembly 322 and the connector 1600. When the back shell 304 is secured to the front shell 302, the connector 1600 may plug into the first microphone 730A, such as into the PCBA 1100 of the first microphone 730A. This connection of the connector 1600 with the first microphone 730A may occur automatically during assembly of the back shell 304 to the front shell 302, or the connector 1600 may be plugged into the first microphone 730A manually before the back shell 304 is secured to the front shell 302.

Figure 17:
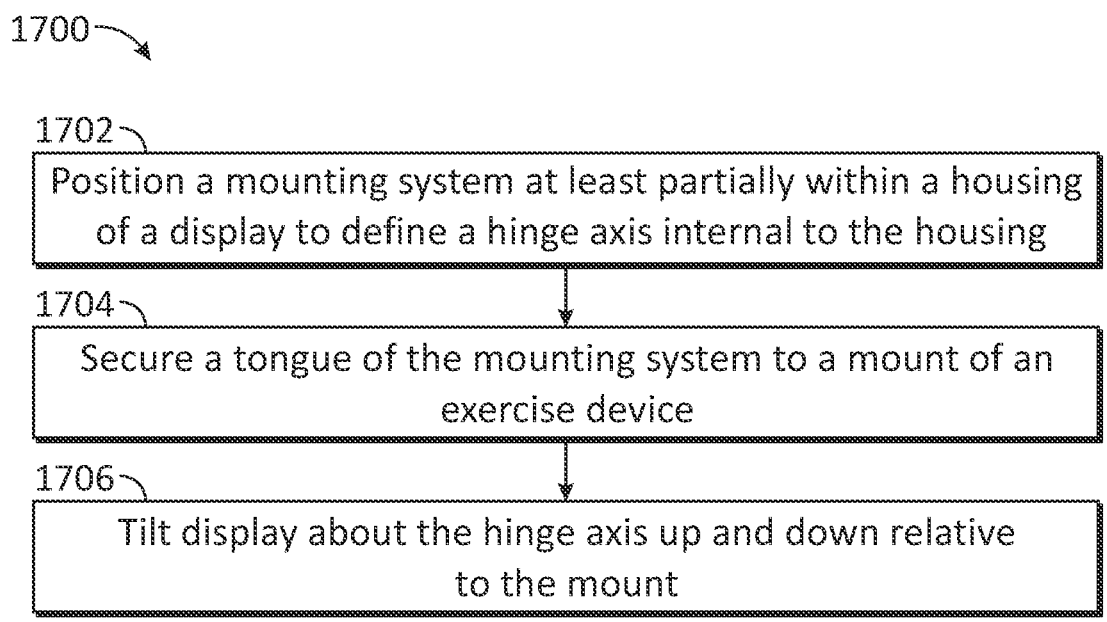
FIG. 17 illustrates a flow diagram of a process of mounting and using a display in accordance with an embodiment of the disclosure.

FIG. 17 illustrates a flow diagram of a process 1700 of mounting and using a display in accordance with an embodiment of the disclosure. Any step, sub-step, sub-process, or block of process 1700 may be performed in an order or arrangement different from the embodiments illustrated in FIG. 17. For example, one or more blocks may be omitted from or added to the process 1700. Although process 1700 is described with reference to the embodiments of FIGS. 1-16, process 1700 may be applied to other embodiments.

In Block 1702, process 1700 includes positioning a mounting system at least partially within a housing of a display to define a hinge axis internal to the housing. The mounting system may be similar to mounting system 330, described above. For instance, the mounting system may include a barrel, a tongue extending from the barrel, and a friction hinge. The barrel may be securable within the housing and may define a hinge axis internal to the housing.

The friction hinge may be configured to releasably hold the barrel at a desired position. In some embodiments, Block 1702 may include rotatably securing the barrel to a front shell of the housing. In some embodiments, Block 1702 may include extending the tongue through an aperture disposed in a back shell of the housing.

In Block 1704, process 1700 may include securing the tongue to a mount of an exercise device. For example, the exercise device, which may be similar to exercise device 100 described above, may include a handlebar having the mount. The mount may include a cavity that receives the tongue of the mounting system. The tongue may be positioned at least partially within the mount and one or more fasteners may extend through the mount and the tongue to secure the tongue to the mount.

In Block 1706, process 1700 may include tilting the display about the hinge axis up and down relative to the mount. For instance, the display may be tilted relative to the mount to orient the display as desired, such as towards a user. The display may be tilted down to orient the display downwards, such as to orient the display towards a shorter user. In like manner, the display may be tiled up to orient the display upwards, such as to orient the display towards a taller user. The display may be tilted up or down to any position between positional extents of the mounting system. For example, the display may be tilted up until the mounting system engages a first stop. Similarly, the display may be tilted down until the mounting system engages a second stop.

All relative and directional references (including up, down, upper, lower, top, bottom, side, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

The present disclosure teaches by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A mounting system comprising:
a barrel securable to a device via a bracket and configured to rotate the device relative to a mount, the barrel defining a hinge axis for the device;
a tongue extending from the barrel and configured to extend from the device for connection to the mount, the tongue comprising a duckbill shape, with the tongue tapering in thickness and width with distance away from the barrel; and
a friction hinge releasably holding the barrel at a desired position, the friction hinge comprising:
a torsion spring comprising a first end secured to the bracket and a second end indexed relative to the barrel, wherein the second end of the torsion spring is secured to a washer indexed with the barrel, and
a friction mechanism comprising a plurality of spring washers.

2. The mounting system of claim 1, wherein:
the bracket comprises a plurality of bracket members secured together;
the barrel defines the hinge axis internal to the device when the barrel is secured to the device; and the tongue passes through a portion of the device for connection to the mount.

3. A display comprising:
a housing with an aperture disposed therein; and
a mounting system comprising:
a barrel secured via a bracket and configured to rotate the display relative to a mount, the barrel defining a hinge axis for the display, wherein the barrel is secured within the housing to define the hinge axis internal to the housing;
a tongue extending from the barrel and through the aperture, and configured to extend from the display for connection to the mount, and the tongue comprising a duckbill shape with the tongue tapering in thickness and width with distance away from the barrel; and
a friction hinge releasably holding the barrel at a desired position, the friction hinge comprising:
a torsion spring comprising a first end secured to the bracket and a second end indexed relative to the barrel, and
a friction mechanism comprising a plurality of spring washers, and wherein the second end of the torsion spring secured to a washer indexed with the barrel.

4. The display of claim 3, wherein:
the housing comprises a front shell and a back shell secured together, the aperture disposed in the back shell; and
the mounting system is secured to the front shell.

5. The display of claim 4, further comprising a volume control centered on a parting line between the front shell and the back shell, wherein the volume control comprises a support bracket mounted to the front shell, the support bracket supporting a printed circuit board assembly (PCBA).

6. The display of claim 4, further comprising:
a microphone disposed on the front shell; and
a power button assembly disposed on the back shell, the power button assembly interfacing with the microphone when the front shell and the back shell are connected.

7. The display of claim 4, wherein the back shell comprises a plurality of holes arranged in a pattern along a bottom half and an upper half of the back shell, the upper half comprising a first number of holes of the plurality of holes and the bottom half comprising a second number of holes of the plurality of holes, the second number of holes greater than the first number of holes.

8. The display of claim 4, further comprising:
one or more low frequency drivers directed out a back side of the housing;
a rear speaker panel configured to cover the one or more low frequency drivers and secured to the back shell via one or more grommets received within corresponding holes disposed in the back shell;
wherein the front shell and the back shell are secured together via one or more fasteners positioned within the holes; and wherein receipt of the one or more grommets within the holes conceals the one or more fasteners securing the front shell to the back shell.

9. The display of claim 8, further comprising:
one or more high frequency drivers directed out a front side of the housing;
a front speaker panel configured to cover the one or more high frequency drivers; and a camera integrated with the front speaker panel.

10. The display of claim 9, further comprising a near field communication antenna disposed around the camera.

11. The display of claim 3, wherein:
the display comprises a center of gravity (COG); and
a distance between the COG and the hinge axis is between 0 mm and 35 mm.

12. An exercise device comprising:
a mount; and
the display of claim 3, wherein the tongue is positioned at least partially within the mount and one or more fasteners extend through the mount and the tongue to secure the display to the mount.

13. The exercise device of claim 12, wherein rotation of the barrel about the hinge axis tilts the display up and down relative to the mount.

14. A method of mounting and using the display of claim 3, the method comprising:
securing the tongue to a mount of an exercise device; and
tilting the display about the hinge axis up and down relative to the mount.

15. An exercise device comprising:
a mount;
a display connected to the mount and comprising:
a housing with an aperture disposed therein, wherein the housing comprises a front shell, a back shell, and a mounting plate secured to the front shell; and
a mounting system comprising:
(i) a barrel secured within the housing via a bracket and defining a hinge axis internal to the housing, such that rotation of the barrel about the hinge axis rotates the display up and down relative to the mount,
(ii) a tongue extending from the barrel through the aperture and connected to the mount,
(iii) a friction or locking hinge releasably holding the barrel at a desired position, the friction or locking hinge comprising a torsion spring comprising a first end secured to the bracket and a second end indexed relative to the barrel, wherein second end of the torsion spring is secured to a washer indexed with the barrel, and the friction hinge comprises one or more spring washers releasably holding the barrel at a desired position, and
(iv) a first bracket member and a second bracket member secured together and to the mounting plate, the barrel rotatably connected to the first and second bracket members.

16. The exercise device of claim 15, wherein the tongue comprises a duckbill shape, with the tongue tapering in thickness and width with distance away from the barrel.

17. A method comprising:
positioning a mounting system at least partially within a housing of a display to define a hinge axis internal to the housing, wherein the mounting system comprises:
a barrel securable within the housing via a bracket and defining the hinge axis internal to the housing;
a tongue extending from the barrel; and
a friction or locking hinge configured to releasably hold the barrel at a desired position, the friction or locking hinge comprising a torsion spring comprising a first end secured to the bracket and a second end indexed relative to the barrel and wherein the second end of the torsion spring is secured to a washer indexed with the barrel;
securing the tongue to a mount of an exercise device; and
tilting the display about the hinge axis up and down relative to the mount.

18. The method of claim 17, wherein positioning the mounting system at least partially within the housing comprises:
rotatably securing the barrel to a front shell of the housing; and
extending the tongue through an aperture disposed in a back shell of the housing.

19. The method of claim 17, wherein the tongue comprises a duckbill shape, with the tongue tapering in thickness and width with distance away from the barrel.

* * * * *